US010195727B2

United States Patent
Ricordi

(10) Patent No.: US 10,195,727 B2
(45) Date of Patent: Feb. 5, 2019

(54) INDIRECT FIRING FASTENING TOOL, A PROPELLING MEMBER AND A FASTENER SUPPORTING SUCH MEMBER FOR THE TOOL, AND A SETTING METHOD FOR A FASTENER

(71) Applicant: ILLINOIS TOOL WORKS INC., Glenview, IL (US)

(72) Inventor: Christian Ricordi, Bourg-les-Valence (FR)

(73) Assignee: ILLINOIS TOOL WORKS INC., Glenview, IL (US)

( * ) Notice: Subject to any disclaimer, the term of this patent is extended or adjusted under 35 U.S.C. 154(b) by 333 days.

(21) Appl. No.: 14/896,079

(22) PCT Filed: Apr. 23, 2014

(86) PCT No.: PCT/US2014/035103
§ 371 (c)(1),
(2) Date: Dec. 4, 2015

(87) PCT Pub. No.: WO2014/200619
PCT Pub. Date: Dec. 18, 2014

(65) Prior Publication Data
US 2016/0121471 A1    May 5, 2016

(30) Foreign Application Priority Data
Jun. 13, 2013  (FR) ...................................... 13 55472

(51) Int. Cl.
*B25C 1/06*    (2006.01)
(52) U.S. Cl.
CPC ...................................... *B25C 1/06* (2013.01)

(58) Field of Classification Search
CPC ........................................................ B25C 1/06
USPC ............................................ 227/145; 29/432
See application file for complete search history.

(56) References Cited

U.S. PATENT DOCUMENTS

| | | | | |
|---|---|---|---|---|
| 4,042,036 A | * | 8/1977 | Smith | B25C 1/005 124/10 |
| 4,121,745 A | * | 10/1978 | Smith | B25C 1/06 227/8 |
| 4,189,080 A | * | 2/1980 | Smith | B25C 1/06 227/8 |
| 4,323,127 A | * | 4/1982 | Cunningham | B25C 1/06 124/78 |

(Continued)

FOREIGN PATENT DOCUMENTS

| | | |
|---|---|---|
| EP | 2135710 A1 | 12/2009 |
| EP | 2514567 A2 | 10/2012 |
| GB | 1316672 A | 5/1973 |

OTHER PUBLICATIONS

ISR and WO for PCT/US2014/035103 dated Jun. 17, 2014; 8 pages.

*Primary Examiner* — Hemant M Desai
*Assistant Examiner* — Valentin Neacsu
(74) *Attorney, Agent, or Firm* — Thompson Hine LLP

(57) ABSTRACT

An indirect firing fastening tool, comprising driving and propelling means for a fastener to be set into a support, such driving means being rotationally mobile and configured to directly cooperate with the fastener or with a propelling member supported by the latter, so that a rotation of the driving means directly causes the translational driving and the propulsion of the fastener.

11 Claims, 4 Drawing Sheets

(56) References Cited

U.S. PATENT DOCUMENTS

| | | | | |
|---|---|---|---|---|
| 4,558,747 A | * | 12/1985 | Cunningham | B25C 1/06 173/121 |
| 4,747,455 A | * | 5/1988 | Cunningham | B25C 1/06 173/1 |
| 2004/0232194 A1 | * | 11/2004 | Pedicini | B25C 1/06 227/131 |
| 2006/0010676 A1 | * | 1/2006 | Robertson | B21C 51/005 29/432 |
| 2009/0194573 A1 | * | 8/2009 | Liang | B25C 1/06 227/131 |
| 2009/0294505 A1 | * | 12/2009 | Kunz | B25C 1/06 227/8 |
| 2010/0065294 A1 | * | 3/2010 | Hirabayashi | B25C 1/06 173/122 |
| 2010/0089969 A1 | | 4/2010 | Fukinuki et al. | |
| 2012/0325887 A1 | * | 12/2012 | Wolf | B25C 1/06 227/146 |

* cited by examiner

INDIRECT FIRING FASTENING TOOL, A PROPELLING MEMBER AND A FASTENER SUPPORTING SUCH MEMBER FOR THE TOOL, AND A SETTING METHOD FOR A FASTENER

RELATED APPLICATIONS

The present application is a National Phase of International Application Number PCT/US2014/035103 filed Apr. 23, 2014 and claims priority to French Application Number 1355472 filed Jun. 13, 2013.

TECHNICAL FIELD

The present invention relates to an indirect firing fastening tool, a fastener propelling member, an assembly comprising a fastener and a propelling member, as well as a setting method for a fastener into a support.

STATE OF THE ART

A fastening or setting tool enables to propel a fastener, such as a nail, a pin, a staple, etc., into a support. The use of the direct firing tools, where the propulsion energy is directly transmitted to the fastener, is prohibited. In an indirect firing fastening tool, such energy is generally transmitted to the fastener through a driver blade or a piston to store energy, transmit it to the fastener to be propelled, and store the residual energy once the fastener is propelled. The propulsion energy can come from the explosion of a powder charge or gas or from the expansion of a spring being previously compressed by a motor.

In the case of a fastening tool with a driving piston, such piston comprises a head that can be moved into a cylindrical housing under the action of the explosion of a charge in a combustion chamber of the tool. The piston rod is then moved within a pin guide of the tool and will strike a fastener and propel it into the support.

The fastener driving and propelling means being here formed by the piston are bulky in particular along the fastener propelling axis. Such congestion problem also exist in the case of a tool, the driving and propelling means of which comprise a driver blade, because of the stroke to be provided for such driver blade and means for guiding the latter. Moreover, the return means of the driving means into their initial position further increase the tool longitudinal congestion, as well as the complexity of the latter.

The present invention aims at providing a simple, efficient and economical solution to such problem.

DISCLOSURE OF THE INVENTION

One object of the invention is to provide an indirect firing fastening tool, comprising driving and propelling means for a fastener to be set into a support, such driving means being rotationally mobile, characterized in that such driving means are configured to directly cooperate with the fastener or with a propelling member supported by the latter, so that a rotation of the driving means directly causes the translational driving and the propulsion of the fastener.

A first difference between the invention and the technologies being currently used in the state of the art relates to the movement of the tool driving means, such driving means being mobile in rotation and not in translation as in the case of prior state pistons and driver blades. Another major difference relates to the fact that such driving means directly cooperate with the fastener or a propelling member supported by the latter so as to drive and propel such member.

In the present application, a "direct cooperation" between two parts means a cooperation with no intermediate part, and in particular with no intermediate part not being translationally connected with the fastener. In the present case, a rotation of the driving means directly leads to a movement, in particular a translational one, of the fastener. The contact or the contact biasing between the driving means and the fastener or the propelling member thereof can be sufficient so that the fastener is driven due to the rotation of such means.

The propelling member or sabot is supported by the fastener, i.e. it is linked with it, in particular in translation. It can be adapted to be dissociated from the fastener upon firing, for example upon the fastener being inserted into the support, as it will be described more in details below.

The fastener can comprise a portion embedded into the propelling member which can form an axial extension of the fastener so that the member enables to continue the propulsion of the fastener up to the full driving thereof into the support. Such member further allows the propulsion conditions for the fastener to be improved by increasing the energy transmission from the driving means.

The fastener may be a single unit or be arranged in collated groups or in single line, etc.

According to a preferred embodiment of the invention, the driving means comprise two inertial flywheels which are mounted rotationally mobile in opposite directions around two substantially parallel axes. The inertial flywheels define between them an engagement space for a fastener. The inertial flywheels are adapted to store rotational mechanical energy in contrast to the translational mechanical energy of the pistons and driver blades of the prior art. Upon a firing, a fastener is engaged into he space between the flywheels and is driven and propelled as soon as it contacts the flywheels.

As it is the case with a driver blade, the fastener receives energy throughout its driving by the inertial flywheels until the fastener and the member thereof are not any more in contact with the flywheels. From this time on, the major part of the residual energy remains in the flywheels and the fastener only retains a tiny part of the total energy of the system.

Preferably, the space between the flywheels has a transversal dimension being lower than at least part of the fastener or the member supported by the latter, so that the fastener or the member thereof is press fitted between the flywheels upon firing and avoids any sliding between the fastener and the flywheels or between the propelling member and the flywheels. The materials of the flywheels, the fastener and/or the propelling member can be selected so as to allow for such press fitting while guaranteeing an optimum lifetime for the tool. The propelling member is for instance made of a less hard material than the fastener one and adapted to be deformed upon firing so as to maximize the energy transmission from the flywheels.

In an exemplary embodiment of the invention, each inertial flywheel comprises on its periphery an external annular groove for guiding and driving the fastener and the member thereof.

In the case where the peripheral grooves of the flywheels have a semi-circular shape, the above mentioned space between flywheels has a substantially circular shape. The fastener or the member thereof can then have at least partly a generally cylindrical shape. However, the peripheries of the flywheels have any shape, the essential being that the flywheels cooperate with the fastener or the member thereof upon firing so as to maximize the energy transmission from the flywheels to the fastener. For example, a comparable result is obtained by using flywheels with a cylindrical periphery and a fastener with a substantially parallelepiped propelling member, the transversal dimension of which is larger than the clearance between the flywheels.

In an alternative embodiment of the invention, at least one of the surfaces in contact, amongst the surfaces of the rotating driving means and the fastener (or the propelling member) is rugged, i.e. not smooth. The peripheral surface of the driving means can for instance include grooves or ribs adapted to improve the transmission of energy from the driving means to the fastener (or the propelling member). The part of the fastener or the propelling member thereof adapted to cooperate with the driving means can have a contact surface being complementary to the driving means. In a particular case of the invention, the driving means include on their periphery teeth meshing with the teeth of a rack supported by the propelling member upon firing.

The inertial flywheels can be fastened on motor shafts or be driven into rotation through belts or gears. In other words, the inertial flywheels are directly driven by shafts or indirectly via movement transmission means such as a speed multiplier device of the gearbox type, for example.

The driving motors for the inertial flywheels can be electrical motors, thereby simplifying the concept of the tool and allowing in particular handheld fastening tools to be manufactured with rechargeable electrical battery.

The tool comprises one end including a propulsion and ejection orifice for the fastener, the drying means being preferably mounted in the tool in the vicinity of such orifice. The tool is then designed so that the fastener is inserted into the support simultaneously with the driving thereof through the driving means. The insertion stroke for the fastener into the support is stopped as soon as the fastener or the propelling member thereof is no more in contact with the driving means.

The propelling member allows in particular the fastener to be well biased against the support adapted to receive such fastener. It enables to continue the driving of the fastener as it crosses the tool propulsion orifice.

Advantageously, at least one of the flywheels is biased towards the other flywheel. In the above mentioned case where the fastener is engaged in the inter flywheel space, the biasing of one flywheel in the direction of the other flywheel allows to press more the fastener or the propelling member between the flywheels and thus to improve the transmission of energy between the flywheels and the fastener or the member while avoiding any sliding risk. A first flywheel can be biased towards the second flywheel by moving the first flywheel in a direction being substantially perpendicular to the rotation axes of the flywheels. In this case, the second flywheel is mounted stationary in the tool, whereas the first flywheel is biased towards the second flywheel, for example by at least one compression spring mounted between the first flywheel and a stationary part of the tool. Alternatively, the two flywheels can be biased towards each other. Each flywheel can then be biased towards the other flywheel through the compression spring mounted between the flywheel and a stationary part of the tool.

The present invention also relates to an assembly comprising a fastener and a propelling member supported by the fastener, for a tool such as above described, characterized in that the propelling member has a lengthened shape and is configured to directly cooperate with driving means of said tool so as to cause the propulsion of the fastener.

Advantageously, the propelling member is configured so as to be at least partially dissociated from the fastener upon the setting of the latter into a support.

As above described, the propelling member is preferably made of a material being less hard than the fastener one.

The propelling member can include at least one weakening longitudinal slot configured to make its dissociation from the fastener easier upon the setting of the latter. Upon firing, the propelling member contacts the support and is deformed so as to be dissociated from the fastener. The longitudinal slot of the member may be designed to cause the member along such slot to be torn and the member parts located on either side of such slot to be torn apart.

The propelling member can form an axial extension of the fastener. This is particularly advantageous for the following reasons: upon a firing, the fastener is still driven after its passage through the above mentioned space, since the part of the propelling member axially projecting from the fastener is still cooperating with the driving means and is still driven by such driving means over a distance corresponding to the longitudinal dimension of such part.

In a particular exemplary embodiment of the invention, the fastener is a nail and the propelling member presents in section a cylindrical or parallelepiped lengthened shape, the extension axis of the member and the longitudinal axis of the nail being substantially juxtaposed.

The present invention also relates to a propelling member for an assembly of the above mentioned type, characterized in that it has a lengthened shape and is configured to directly cooperate with driving means of a tool so as to cause the propulsion of the fastener.

Advantageously, the propelling member is configured to be at least partially dissociated from the fastener upon the setting of the latter in a support.

The present invention finally relates to a setting method for a fastener in a support, through an indirect firing fastening tool, characterized in that the fastener or a propelling member supported by the latter is driven into translation and propelled from the tool by a direct cooperation with the rotating driving means of the tool.

DESCRIPTION OF FIGURES

The invention will be better understood and other details, characteristics and advantages of the invention will appear on reading the following description made as a non limitative example and in reference to the accompanying drawings, wherein.

DETAILED DESCRIPTION

Figure 1:
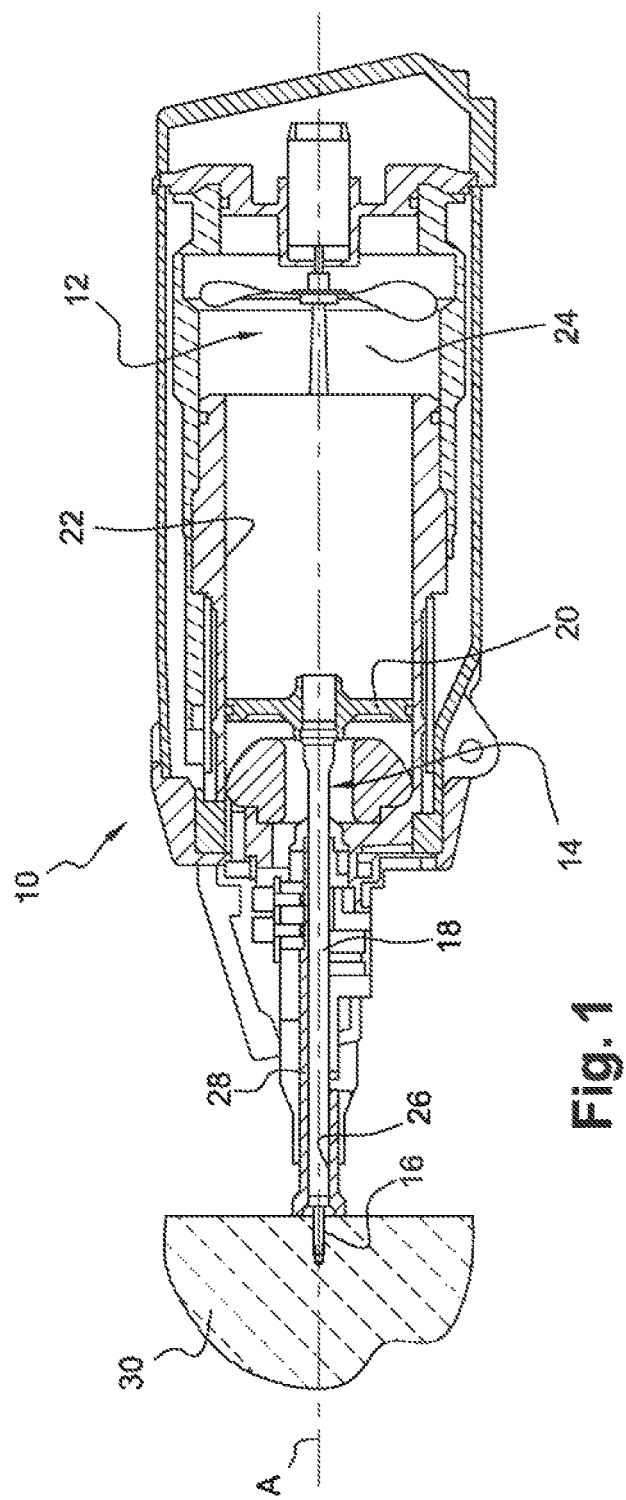
FIG. 1 is a schematic sectional view of an indirect firing fastening tool of the state of the art.
Figure 2:
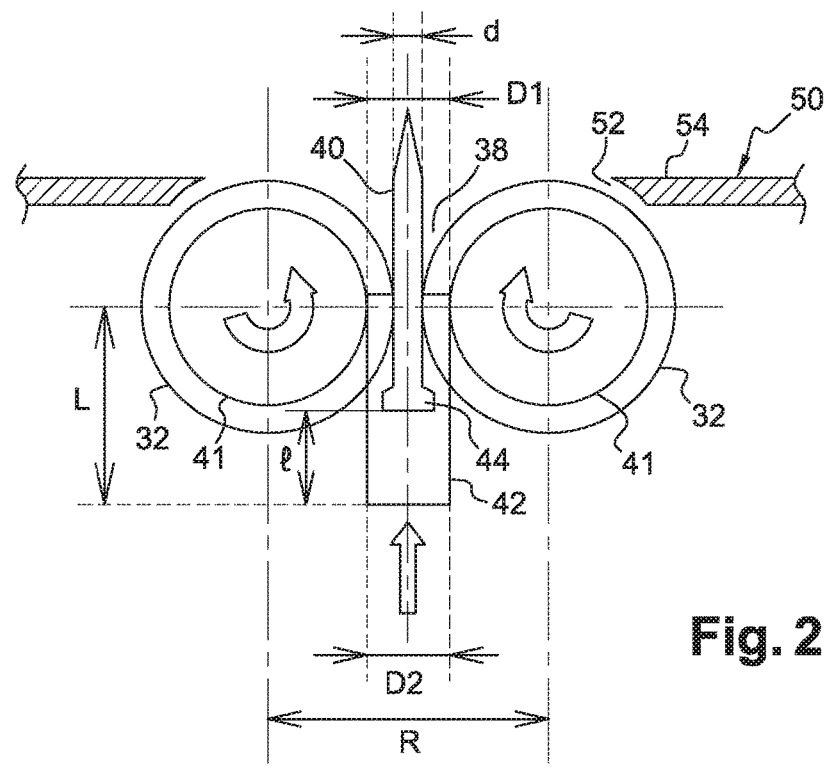
FIGS. 2 and 3 are schematic front and side views of rotating driving means for an indirect firing fastening tool according to the invention, respectively.

It is first referred to FIG. 1 representing an indirect firing fastener tool 10 according to the state of the art, such tool being here a nailing machine with an internal combustion engine 12. The tool 10 includes one piston 14 for driving a nail 16, such piston comprising a rod 18 connected on one end to a head 20 which can be moved into translation within a cylindrical housing 22 of the tool under the action of the fuel firing within the combustion chamber 254 of the tool.

Upon a firing, the rod 18 of the piston 14 is moved into translation in the bore 26 of a pin guide 28 and will strike the nail 16 to propel it into a support 30.

As above explained, the piston 14 forming the driving and propelling means for the nail 16 has a longitudinal dimension (along the axis A) being quite important and thus creates an important longitudinal congestion.

The present invention allows such problem to be remedied thanks to new driving and propelling means which are mobile into rotation and not into translation. Thus, they do not have any axial movement stroke, thereby limiting the axial or longitudinal congestion of such means.

FIGS. 2 to 7 represent a first embodiment of the invention, wherein the driving means comprise two rotating inertial flywheels 32, being here formed by rollers directly mounted on shafts 34 of two electrical motors 36.

The rotation axes of the flywheels 32 are parallel and the flywheels rotate in opposite directions. As it is visible on FIG. 2, one of the flywheels (on the left on the drawing) rotates anticlockwise and the other flywheel (on the right) rotates clockwise.

The flywheels 32 are arranged in mutual vicinity and define between them an engaging and passing space 38 for the fastener 40.

In the example being shown, each flywheel 32 comprises on its external periphery an annular groove 41 which has here in section a semi-circular shape. The distance (R) of the axes between the flywheels 32 is such that the above mentioned space 38 defined by the grooves 41 has a substantially circular shape, the transversal dimension or diameter of which is referred to D1.

The fastener 40 is here a nail supporting a propelling member or sabot 42. The nail end part comprising the head 44 is embedded into the member 42. The member 42 has here a substantially cylindrical lengthened shape. It has a transversal dimension or diameter D2 being larger than the diameter d of the nail and the diameter D1 of the space 38 so that the member is biased while passing between the flywheels 32. The lengthening axis thereof is juxtaposed with the longitudinal nail axis and it is mounted on the nail so that it forms an axial extension for the nail, on the side of its head 44. It has an axial or longitudinal dimension L, the part thereof defining the above mentioned lengthening having an axial or longitudinal dimension l. Such dimension l is in particular a function of the desired driving of the nail and of the radius of the inertial flywheels in the tool.

The nail is made of a metal alloy. As explained in the following, the member 42 is preferably made in a material being less hard than the nail one. The member 42 can be integrally made of a single part in a metal alloy, in plastics, etc.

The member 42 can comprise weakening slots 46, the function of which will be detailed in the following. In the example represented on FIG. 3, the member 42 comprises two longitudinal diametrically opposed slots 46, such slots extending on a major part or on the totality of the length of the member 42.

The inertial flywheels 32 directly cooperate with the propelling member 42 supported by the nail so that the rotation of the flywheels leads directly to the translational driving of the nail, during the time where the propelling member is in contact with the flywheels.

Thus, the nail is no more driven into translation when the member 42 is not in contact anymore with the flywheels 32.

The inertial flywheels are thus mounted in the immediate vicinity of the nail outgoing and propelling orifice of the tool.

The reference annotation 50 means the distal end tip of the tool which is adapted to be applied onto the support and comprises the above mentioned nail propulsion orifice 52. Such tip comprises here a plane wall 54 behind which the flywheels are mounted and the front side of which forms a bearing face on the support. Such wall 54 is substantially perpendicular to the plan of the drawing on FIG. 2 and parallel to the plan of the drawing on FIG. 3.

FIGS. 4 to 7 represent setting steps for a fastener into a support.

Figure 6:
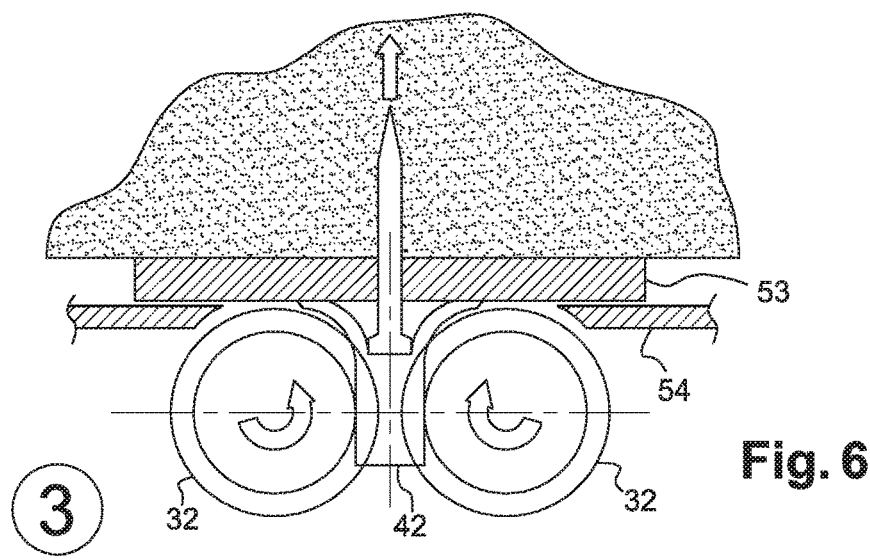
Figure 7:
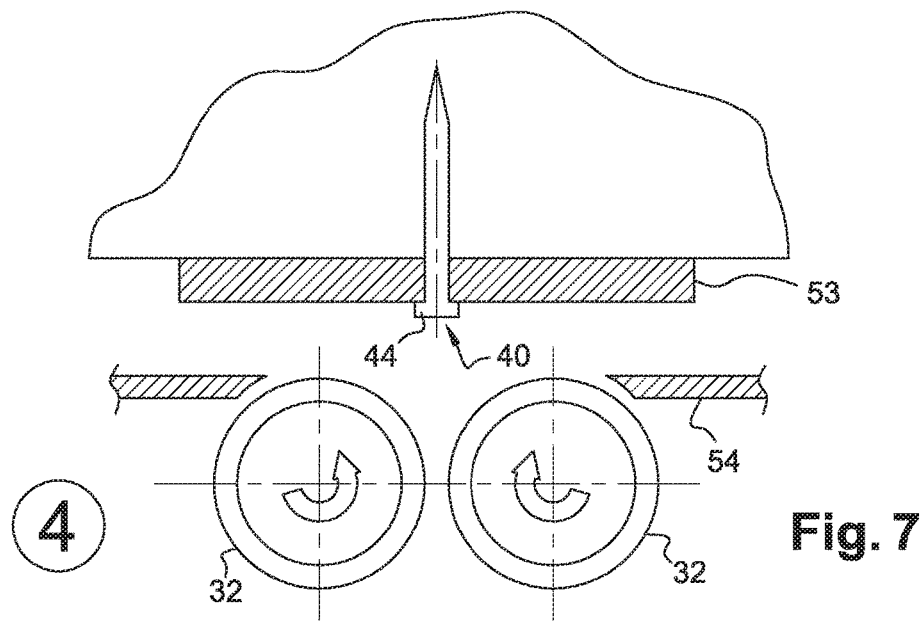

The tool is put in a firing position on a support 53 so that the above mentioned wall 54 abuts against such support. On FIG. 4, the inertial flywheels 32 rotate around their axes and the operation of the tool firing trigger causes the movement of a nail and the member 42 thereof in the space 38 between the flywheels (arrow 51). The movement of the nail and the member thereof should be sufficient so that the member 42 is engaged into the above mentioned space 38 and contacts the flywheels 32. As soon as the member 42 is in contact with the flywheels 32, it is driven by the latter into translation on a stroke substantially corresponding to the length L of the member. A compression of the member between the flywheels enables to limit the member sliding risk between the flywheels. As it is driven, the nail crosses the propulsion orifice 52 of the wall 54 of the tool and is inserted into the support 53 (FIG. 6). The propelling member 42, which is not designed here to be inserted into the support 53, contacts the latter and is plastically deformed. The above mentioned slots 46 have as an object to make tearing of the member 42 easier along such slots and to improve the deformation of the member and its separation from the nail, which can be then driven into the support 53 until its head 44 abuts against an external side of the latter (FIG. 7).

Figure 3:
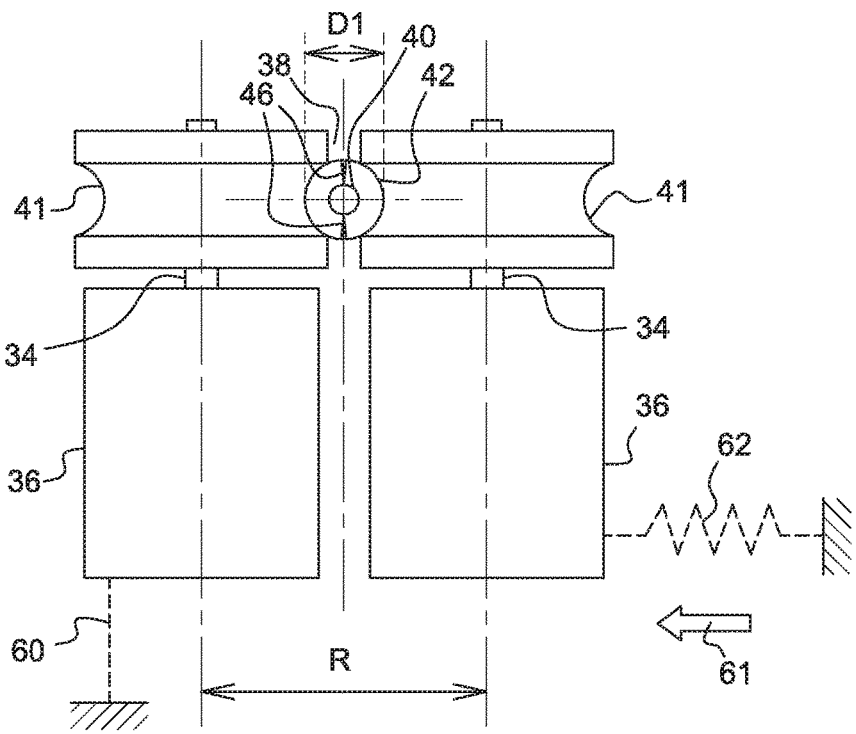
Figure 4:
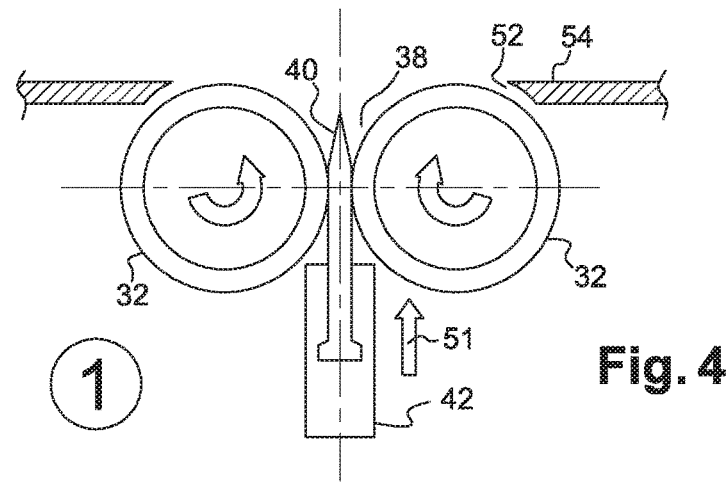
FIGS. 4 to 7 are views similar to FIG. 2 and illustrate steps for using the tool and setting a fastener into a support.
Figure 5:
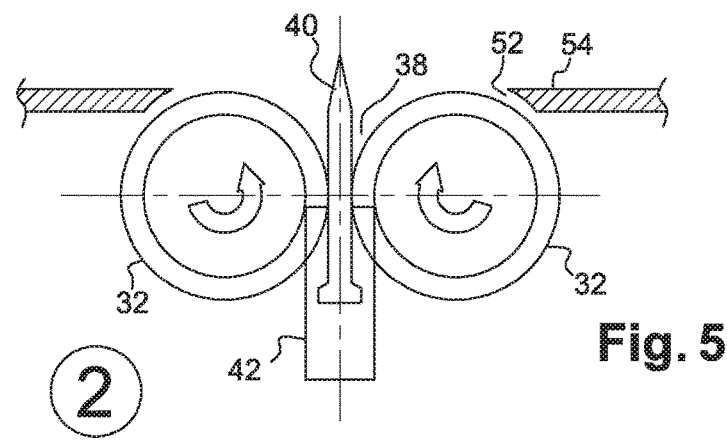

FIG. 3 further shows an advantageous variation of the invention wherein a first motor 36 associated with one of the flywheels 32 (on the left on the drawing) is fixedly mounted in the tool (dotted lines 60), whereas the second motor associated with the other flywheel is biased towards the first motor (arrow 61) so as to reduce the distance R between the axes of the flywheels and increase the compression force of the propelling member 42 between the flywheels. A compression spring 62 can be mounted between the second motor 36 and a fixed part of the tool. Alternatively, each motor is biased towards the other motor by spring type biased means, for example. In still another alternative, the return force exerted by the biasing means on the or each motor (or flywheel) can be adjusted depending for example on the fastener type and on the nature of the support adapted to receive such fastener.

Figure 8:
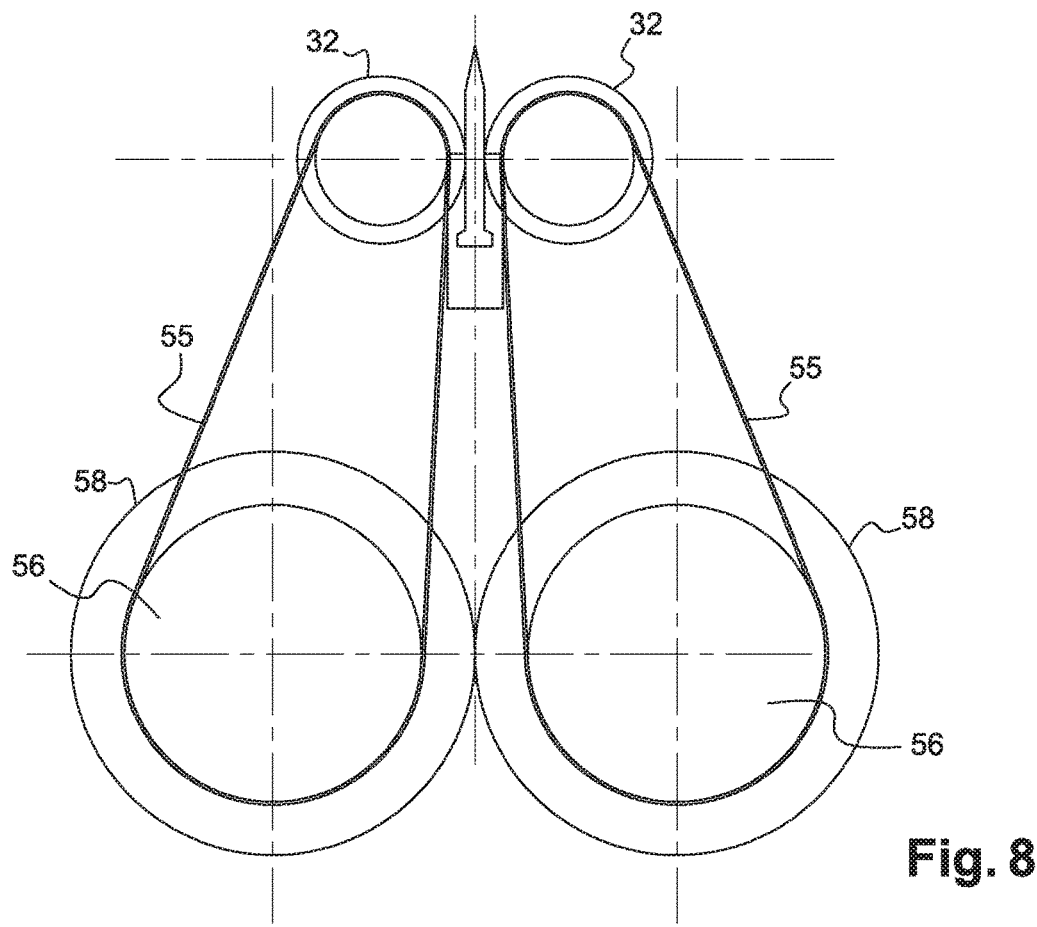
FIG. 8 is a front schematic view of the rotating driving means for an alternative embodiment of the tool according to the invention.

FIG. 8 shows an alternative embodiment of the invention, wherein the inertial flywheels 32 are not directly mounted on motor shafts, but are driven into rotation through belts 55 driven by pulleys 56 mounted on motor shafts 58 which are thus mounted away from the inertial flywheels. Alternatively, the man skilled in the art will be able to provide such driving with pinions or notched belts.

The rotation speed of the inertial flywheels can for example be defined to reach a tangential driving speed of the propelling member of about 100 m·sec$^{-1}$, which is the maximum speed being authorized upon an indirect firing.

The invention claimed is:

1. An indirect firing fastening tool, comprising a driving means for a fastener to be laid into a support, the driving means being rotationally mobile, wherein the driving means has an annular groove that at least in part defines a fastener driving space located in a plane which includes a rotational axis of the driving means, the annular groove configured to directly contact and cooperate with the fastener or with a propelling member supported by the fastener as at least part of the fastener moves translationally through the fastener driving space, so that a rotation of the driving means directly causes translational driving and propulsion of the fastener.

2. The tool according to claim 1, wherein the driving means comprise two inertial flywheels which are mounted rotationally mobile in opposite directions around two parallel axes.

3. The tool according to claim 2, wherein the inertial flywheels are fastened on motor shafts or rotationally driven by pulleys.

4. The tool according to claim 2, wherein the inertial flywheels define between them the fastener driving space.

5. The tool according to claim 4, wherein the fastener driving space has a transversal dimension being lower than at least part of the fastener or the propelling member supported by the fastener.

6. The tool according to claim 2, wherein each of the inertial flywheels comprises a peripheral external annular groove which is the annular groove configured to directly contact and cooperate with the fastener or with the propelling member.

7. The tool according to claim 2, wherein at least one of the inertial flywheels is biased towards the other inertial flywheel.

8. The tool according to claim 1, further comprising one end including a propulsion and ejection orifice for the fastener, the driving means being mounted in the tool in a vicinity of said orifice.

9. An indirect firing fastening tool, comprising:
two inertial flywheels for driving a fastener into a support, wherein the inertial flywheels are mounted on two parallel axes to be rotatable in opposite directions, and
wherein each of the inertial flywheels comprises a peripheral external annular groove configured to directly contact and cooperate with the fastener or with a propelling member supported by the fastener, wherein at least part of the fastener is embedded in the propelling member, so that rotations of the inertial flywheels in the opposite directions directly cause translational driving and propulsion of both the propelling member and the fastener.

10. The tool according to claim 9, wherein at least one of the inertial flywheels is elastically biased towards the other inertial flywheel.

11. The tool according to claim 10, wherein
the fastener has a shank and a head,
the head and a portion of the shank are embedded in the propelling member, and a remaining portion of the shank is exposed from the propelling member to be driven toward the support,
the peripheral external annular grooves of the inertial flywheels define therebetween an engagement space for the propelling member, and the engagement space has a transversal dimension smaller than a diameter of the propelling member, and
the propelling member has a weakened portion configured to cause tearing of the propelling member and separation of the propelling member from the fastener when the propelling member contacts the support upon firing.

* * * * *